March 3, 1959 — G. W. CORNELIUS — 2,875,529
DEVICE FOR TEACHING BASIC ARITHMETIC
Filed Aug. 3, 1954 — 2 Sheets-Sheet 1
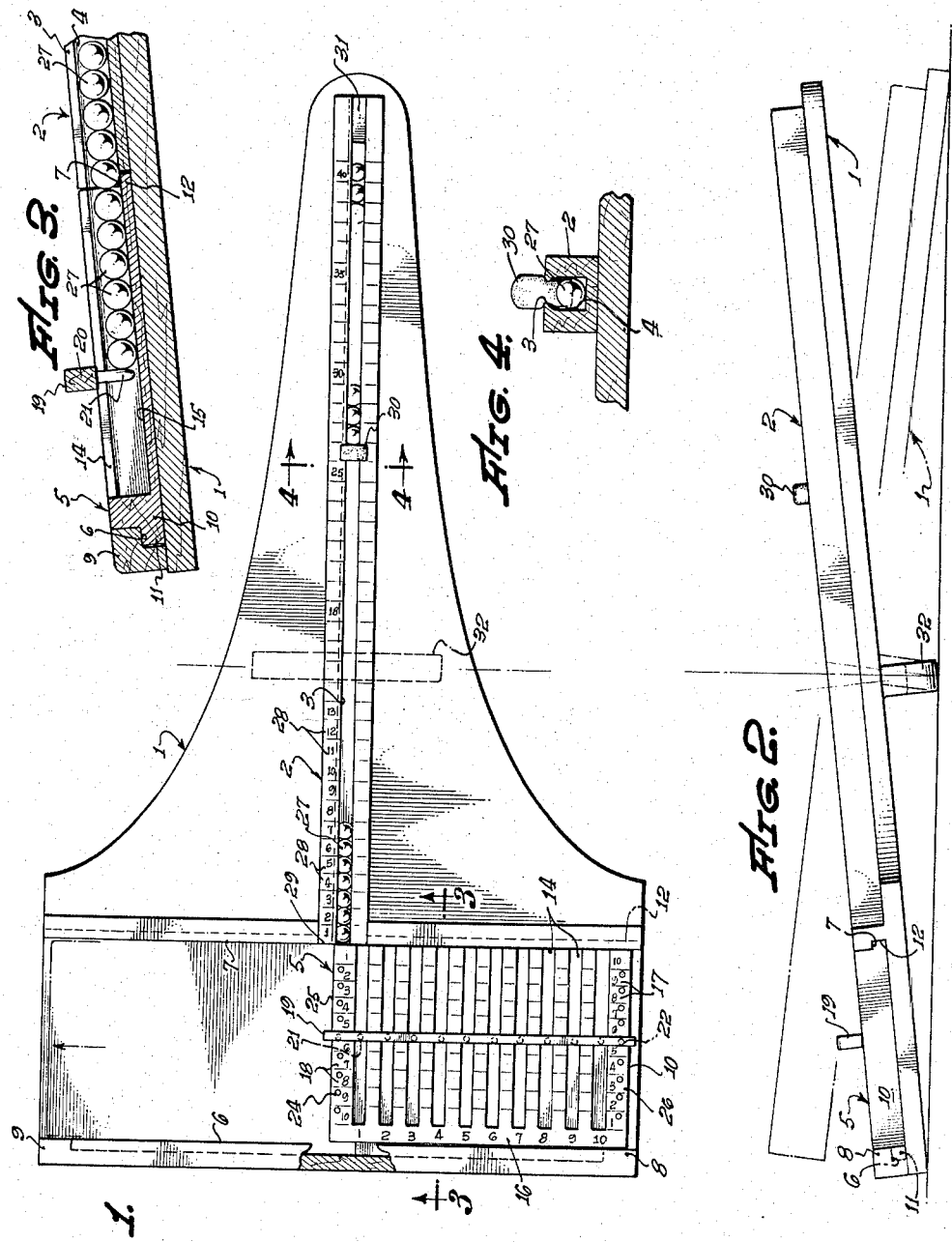
GEORGE W. CORNELIUS,
INVENTOR.
BY
ATTORNEY.

March 3, 1959 G. W. CORNELIUS 2,875,529
DEVICE FOR TEACHING BASIC ARITHMETIC
Filed Aug. 3, 1954 2 Sheets-Sheet 2
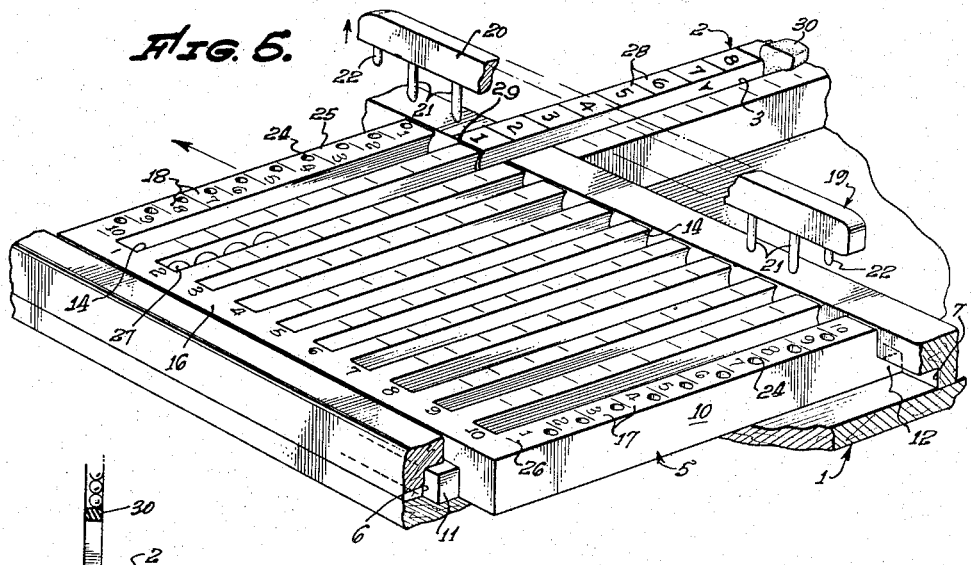
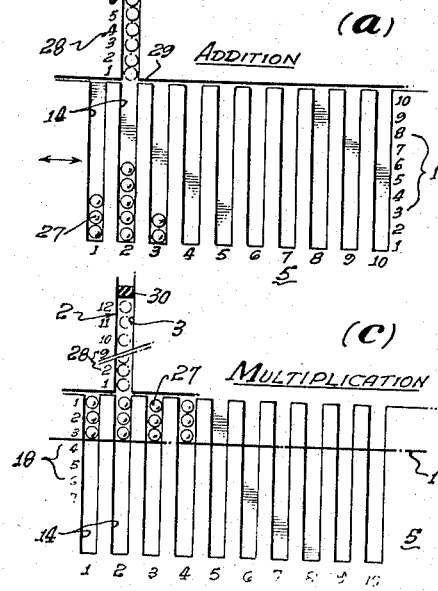
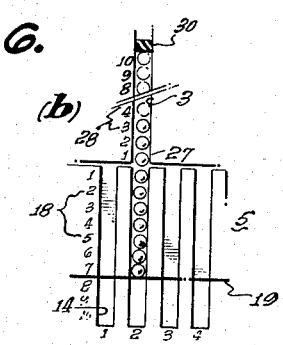
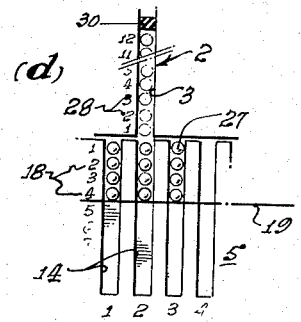
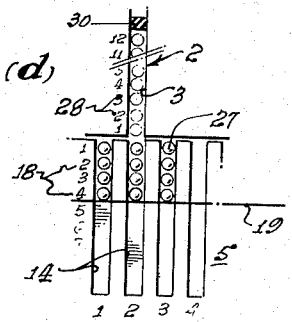
GEORGE W. CORNELIUS,
INVENTOR.
BY
ATTORNEY.

United States Patent Office 2,875,529
Patented Mar. 3, 1959

2,875,529

DEVICE FOR TEACHING BASIC ARITHMETIC

George W. Cornelius, San Gabriel, Calif.

Application August 3, 1954, Serial No. 447,556

8 Claims. (Cl. 35—32)

This invention relates to educational devices, and particularly to a device in which a plurality of counting elements may be manipulated by an elementary pupil to obtain a physical picture of the nature and effect of the basic arithmetical operations and to learn how to perform such operations. This application is a continuation in part of my co-pending patent application, Serial No. 359,888, filed by me June 5, 1953, now abandoned.

It has been the usual experience of teachers, who endeavor to instruct young children in arithmetic, that many of them have considerable difficulty in learning arithmetic and in forming a mental picture of the successive stages involved in carrying out the elementary operations of addition, subtraction, multiplication and division. Teachers have found it extremely helpful in explaining the principles of such operations to their pupils, to use a number of physical objects which the child may play with while learning how to add several numbers together, or how to subtract one number from another. Concrete pictures of the operation are also helpful in explaining the somewhat more advanced operations of multiplication and division.

I have invented a form of computing device which may be readily used by children of primary school grades, on which they may reproduce the processes involved in various elementary arithmetic processes in such a concrete fashion that their minds are better able to grasp the principles of representing a plurality of objects by number and then performing various computations in relation to those objects.

My invention is embodied in a device illustrated in the accompanying drawings as having a body supporting an elongated main storage channel, in which may be stored a number of counting elements of uniform size. A numerical reference scale is provided alongside the channel so that the child may see at a glance how many counting elements are contained therein. A divider or stop member is provided with which this channel may be blocked off at any point to segregate a desired number of the counting elements from others. At one end of the device, and adjacent the origin of the reference scale, there is disposed for movement transversely thereof a shuttle element, which has a number of auxiliary storage channels. These auxiliary channels may be selectively disposed in position to receive a number of the counting elements from, or deliver them back to, the main channel. The auxiliary storage channels may be blocked off at a desired point by a divider board. The blocking means so provided functions so that a uniform capacity, of whatever value, is provided in each of them. Numerical scales are provided along the edges of the auxiliary shuttle unit so that the child may see at a glance how many counting elements he has in each of the auxiliary channels, and what number represents this quantity. Midway of the long dimension of the main storage channel and the auxiliary shuttle member, there is disposed a fulcrum or tilting member extending downwardly beneath the device. This fulcrum member is so arranged that the entire assembly may be rocked thereon to permit the counting elements to flow by gravity between the main and auxiliary storage channels. Each of the auxiliary storage channels may be registered, or aligned, selectively with the main storage channel, so that as the board is tilted, counting units may pass between the main channel and the particular auxiliary channel aligned therewith.

The invention has been illustrated in the drawings, in which:

Figure 1 represents a top elevational view of an embodiment of the invention;

Fig. 2 is a side view of the device illustrated in Fig. 1, shown in solid lines as tilted in one direction, with a dotted outline showing the device tilted in the opposite direction;

Fig. 3 is a fragmentary sectional view, taken as indicated by line 3—3 of Fig. 1, showing details of the construction of the auxiliary shuttle and the divider bar;

Fig. 4 is a detailed fragmentary sectional view, taken as indicated by line 4—4 of Fig. 1 of the main storage channel and its divider, or stop;

Fig. 5 is a perspective fragmentary view showing additional structural details of the shuttle member; and Fig. 6 is a schematic figure comprising four parts employed to explain how the device is used in teaching the four basic arithmetical processes: (a) Addition; (b) Subtraction; (c) Multiplication; and (d) Division.

In the drawings, and more particularly in Figs. 1 and 2, I have shown an embodiment of the invention in which an elongated body member 1 has fixed thereto a main storage channel 2 extending in the direction of the long dimension of the body member, and having a top groove portion or slot 3 of lesser width than that of the interior groove portion 4. Channel 2 is arranged to communicate with selected portions of a shuttle 5. The shuttle 5 is slidably mounted in grooves or tracks 6 and 7 for movement transversely of the main storage channel 2. Movement of the shuttle 5 within the tracks 6 and 7 is limited by the engagement of a body member 10 extending laterally from the shuttle 5 with one or the other of two end stops 8 and 9 formed terminally of the track 6. The shuttle 5 comprises body member 10, from opposite sides of which protrude the tongues 11 and 12. Tongues 11 and 12 slidably engage within the groove tracks 6 and 7.

A plurality of parallel grooves or slots 14 are formed in the upper surface of the shuttle body member 10 and constitute auxiliary storage channels. The grooves 14 are of uniform size and adapted to smoothly and rollably receive and retain the individual counting elements, which are commonly spherical balls of uniform size composed of steel, marble, or wear-resistant plastic material. In the embodiment shown, there are ten of the parallel auxiliary channels 14, each having a wider interior 15. This retains the counting elements but permits free rolling movement thereof. The auxiliary channels 14 are designated by means of a scale 16 reading from 1 to 10, inclusive, along the lower edge of the shuttle in positions where they may be seen readily by the user. Additional numbering scales are provided along the sides of the shuttle 5. I have shown a right-hand scale 17 as reading from 1 to 10 upwardly and a left-hand scale 18 as reading from 1 to 10 downwardly. A divider board 19 may be placed across the auxiliary channels 14 to limit their capacity to a selected uniform number of counting elements. The divider board consists of a crossbar 20 (see Figs. 3 and 5), having a plurality of separating pins 21 projecting from its lower side and spaced to align with the centers of the parallel auxiliary channels 14 when end spacing pins 22 are fitted into oppositely disposed pairs of alignment bores 24 formed in the side portions 25 and 26 of the shuttle 5. It will be noted that when the spacing pins 22 are located in alignment holes 24 beneath a number, such as 5, on the left hand scale 18, the auxiliary channels 14 are adapted to receive an equal number of counters above the divider board 19.

The main storage channel 2 extends lengthwise of the body member 1 and parallel to the auxiliary storage channels 14, with which it is arranged to communicate selectively. Both the main and auxiliary channels are adapted to receive a plurality of the spherical counting elements or balls 27. The balls must be of a suitable diameter to permit them to roll freely within the main and auxiliary channels and their number may be read on a scale 28 having its origin 29 adjacent the shuttle 5, and extending along the main storage channel 2. The spacing of the end pins 22 and the cooperating alignment bores 24 insures that the board 19 will be exactly normal to the auxiliary channels 14. It will be obvious that when the divider board 19 is in such a position, equal storage spaces are available in the shuttle in each of the auxiliary storage channels 14.

A divider member is also provided for use in the main storage channel 2. This divider member 30 may be formed of a resilient material, and may be in the form of a rubber plug or a spring member. The divider member 30 is held by friction against the opposite sides of the open groove 3, and extends into position between a pair of adjacent balls 27. The channel 2 is completely blocked at the end opposite the point where it engages the shuttle 5 by end closure means 31. Beneath the body member 1 and extending downwardly therefrom is disposed a fulcrum or tilting member 32 arranged transversely of the main storage channel 2. When the board is tilted about the fulcrum member 32 the balls in the main storage channel 2 and in the auxiliary storage channels 14 in the shuttle 5 tend to roll toward the lower end of the device.

It will be noted that the bottom end of the main channel 2 and the upper ends of the auxiliary channels 14 act as origins 29 for the channel scales 18 and 28.

It will thus be apparent that a selected number of balls may be transferred from the main storage channel 2 into one of the auxiliary storage channels 14 whenever the main channel is aligned therewith and the device is properly tilted, or may be returned to the main channel when the device is tilted in the opposite direction.

To assist in understanding the invention more fully, the method of using the device will next be described in demonstrating the solution of simple problems in addition, subtraction, multiplication and division. Usually before commencing any operation, it is convenient to first clear the shuttle of balls by rolling them into the main channel. The device is then ready to use in any of the processes as described below.

Addition

Consider first a simple addition problem, that of adding three, five and two, shown in process in part (a) of Fig. 6, with certain of the preliminary steps completed, and the operations carried out in arriving at the final total of ten. The initial position of the shuttle is not critical, but in view of the conventional arrangement of written material, it is preferable to start with the shuttle 5 at the right end of its track so that the one of the auxiliary storage channels 14 designated as 1 on scale 16 is aligned with the main storage channel 2. The device is first tilted so that the shuttle is in the lowered position. Three balls, representing the first number in the series to be added, are permitted to roll from the main storage channel into the selected auxiliary channel. It will be easy for the pupil to see that there are three balls in the first auxiliary channel, and that the third ball is opposite the numeral "3" on the scale 26 at the right side of the shuttle. The shuttle 5 is then moved one channel to the left, so that the one of the auxiliary channels 14 numbered "2" is aligned with the main storage channel 2. Five balls, representing the next number in the series to be added, are permitted to roll into this auxiliary storage channel. The pupil can then associate the five visible balls with the numeral "5" on the right shuttle end scale 24. This is the stage illustrated in part (a) of 6. The third step is to again move the shuttle 5 to the left so that the one of the auxiliary channels 14 numbered "3" is aligned with the main storage channel 2. Two counters, representing the third number in the addition series, are permitted to roll into this channel for temporary storage. The shuttle is then shifted transversely to block off main channel 2 from the auxiliary channels 14 and the device is tilted to raise the shuttle.

The plug 30 is inserted into the main storage channel 2 to restrict the remainder of the counters to the portion of that channel farthest from the shuttle 5, and to exclude them from interfering with the subsequent steps. Since the counters so blocked off are entirely separate physically, the student will be able to understand that they are not involved in the problem. At this stage, the portion of the main storage channel 2 between the plug 30 and the shuttle 5 is completely free of counters, and three, five and two stored in the temporary storage channels 14, numbered 1, 2 and 3, respectively on scale 16.

Thus, the groundwork has been laid for explaining the actual process of addition, which is begun by traversing the shuttle member 5 to bring each of the three auxiliary storage channels, numbered 1, 2 and 3 on scale 16, into successive alignment with the main storage channel 2. As each of the auxiliary channels comes into registry, the balls 27 contained therein roll back into the main storage channel, but are prevented by the plug 30 from mixing with the remainder of the counters there stored. After all the counters have been returned, the shuttle 5 is shifted to block off the lower end of the main storage channel 2. The device is again tilted on the fulcrum member 32 so that the counters collect in the lower numbered portion of the main channel 2, as indicated in dotted outline in part (a) of Fig. 6. The pupil may then see that the uppermost of the counters accumulated is opposite the numeral 10 on the scale 28 marked on the sides of the main channel 2, thus indicating the total. The student may thus associate the numeral 10 with the number of marbles actually visible at that point, and he can see that this number has been obtained by adding the several numbers: 3, 5 and 2.

Subtraction

Next consider the subtraction process, with the assistance of part (b) of Fig. 6. In this case after the shuttle has been emptied the channel 2 is blocked off at the fulcrum end thereof by means of the shuttle, and the device is tilted so that the main supply of balls is opposite the scale 28 at the lowered end of that channel. If the problem is to subtract 7 from 10, leaving 3, the stopper 30 is first inserted above the 10th ball, as indicated by the scale 28, isolating the reserve balls from the minuend 10. The divider board 19 is then set in position in the shuttle just below the numeral 7 on scale 18, fixing the capacity of each of the auxiliary channels 14 equal to the subtrahend 7. Shuttle 5 is moved to bring any one of the auxiliary channels 14 into registry with main channel 2, and the selected channel is filled to capacity by gravity. After shifting the shuttle 5 enough to block main channel 2, the pupil may readily coordinate the numeral 7 on the left-hand scale 18 with the seven visible counters in the shuttle; he may observe the three counters remaining in the main storage channel 2 and make a comparison with the numeral 3 on the scale 28. Thus, he obtains a visual picture of the process of subtracting the subtrahend 7 from the minuend 10 to yield the remainder or answer 3.

Multiplication

Next consider the case of multiplication, using for example the problem 3×4. The divider board 19 is set in position in the shuttle just below the numeral 3 on the left-hand scale 18, fixing the capacity of each of the temporary storage channels 14 at three counters as indicated in part (c) of Fig. 6. With the shuttle end tilted downwardly, the shuttle 5 is shifted laterally to permit four of the auxiliary channels, preferably those opposite numerals 1, 2, 3 and 4 on scale 16, along the bottom edge of the shuttle, to be filled from the main storage channel. The remainder of the counters in the main storage channel 2 are blocked off at its upper end by the stopper 30, so that they are excluded from consideration. At this stage the storage channel 2 is empty of counters up to the stopper 30.

The multiplication is carried on by shifting the shuttle 5 laterally to bring successive ones of the temporary storage channels 14 into registry with channel 2. As each of the auxiliary storage channels comes into alignment with the main storage channel 2, the balls therein are discharged by gravity into the empty portion of the latter. When the shuttle 5 is entirely empty and channel 2 blocked off by a further lateral movement of the shuttle, the device 1 is again tilted down, whereupon all the balls employed in the problem align against the scale 28. It will be apparent to the pupil that the numeral "12" associated with the number of counters there collected is the product that results from ultiplying three by four.

From the foregoing explanation, it will be obvious that problems must be selected which will not produce a product greater than the available storage channel capacity.

Division

The last, and perhaps the most difficult, of the basic arithmetical concepts is that of division.

Consider the problem of dividing 12 by 4. With the shuttle 5 empty, the divider board is placed in position so that the capacity of each of the auxiliary storage channels 14 is limited to four, the divisor, as illustrated in part (d) of Fig. 6. Next, the stopper 30 is so inserted in channel 2 as to segregate 12 balls, representing the dividend, while holding the rest of the reserve supply in the upper portion of channel 2. The pupil then solves the problem by successively shifting the shuttle to bring the auxiliary storage channels into alignment with the main storage channel 2. With the shuttle tilted downwardly, each of the temporary channels receives a maximum of four counters. When the first channel 1 has been filled to capacity, the shuttle is shifted so that the second channel 2 may be filled, and the process is repeated until all of the counters in the main storage channel not restrained by stopper 29 have been released into the shuttle.

The pupil will be able to visualize that he has taken four counters at a time from the original total, and that the result has been that he has been able to fill three of the auixliary storage columns to capacity. Thus, he learns that dividing a dividend 12 by a divisor 4, the quotient 3 is obtained, and he can associate the numeral "3" on scale 16 with the total number of filled columns which can be successively subtracted from the original quantity.

While the invention has been described as used for explaining simple arithmetic processes, it will be apparent that it is also useful in teaching some aspects of more advanced concepts, such as improper fractions, and squaring.

It will thus be seen that I have provided an educational device which enables the teacher to demonstrate and the pupil to visualize, arithmetical operations more readily than the conventional abstract methods of teaching.

While the invention has been described with reference to only a single embodiment thereof, it will be apparent to those skilled in the art that various changes may be made in the material, form, details of construction and arrangement of the parts without departing from the invention. It is, therefore, to be understood that the invention is not limited to the embodiment shown and described, but includes all forms thereof within the scope of the appended claims.

The invention claimed is:

1. An educational device comprising: a main storage channel; shuttle means movable transversely of said main storage channel; a plurality of auxiliary storage channels on said shuttle means and arranged to be registered one at a time with said main storage channel as said shuttle means is moved transversely thereof so that said auxiliary storage channels may selectively communicate with said main storage channel, said storage channels extending in about the same direction; a plurality of counting members adapted to be moved in said main storage channel and in said auxiliary storage channels; and means for indicating the numbers of said counting members located in said auxiliary channels.

2. An educational device comprising: a main storage channel, said channel having an origin at one end thereof; means for adjustably limiting the capacity of part of said main storage channel at the end thereof at which said origin is located; shuttle means movable transversely of said main storage channel; a plurality of auxiliary storage channels on said shuttle means and arranged to be registered one at a time with said part of said main storage channel as said shuttle means is moved transversely thereof so that said auxiliary storage channels may selectively communicate with said part of said main storage channel; a plurality of counting members adapted to be moved in said main storage channel and in said auxiliary storage channels; means for indicating the numbers of said counting members located in said auxiliary channels; and means for indicating the number of counting members located in said part of said main storage channel.

3. An educational device comprising: a main storage channel; shuttle means movable transversely of said main storage channel; a plurality of auxiliary storage channels on said shuttle means and arranged to be registered one at a time with said main storage channel as said shuttle means is moved transversely thereof so that said auxiliary storage channels may selectively communicate with said main storage channel, said storage channels extending in about the same direction; a plurality of counting members shaped to roll from one registered channel to the other registered channel when one of said auxiliary storage channels is registered with said main storage channel; fulcrum defining means for establishing a tilting axis normal to the axes of said storage channels whereby said counting members may be rolled from one of said registered channels to the other of said registered channels by gravity; and means for indicating the numbers of said counting members located in said auxiliary channels.

4. An educational device comprising: a main storage channel, said channel having an origin at one end thereof; blocking means for adjustably limiting the capacity of part of said main storage channel at the end thereof at which said origin is located; shuttle means movable transversely of said main storage channel; a plurality of auxiliary storage channels on said shuttle means and arranged to be registered one at a time with said part of said main storage channel as said shuttle means is moved transversely thereof so that parts of said auxiliary storage channels may selectively communicate with said part of said main storage channel; a plurality of counting members adapted to be moved in said main storage channel and in said auxiliary storage channels; first scale means associated with said main storage channel and calibrated in relationship to said origin for indicating the number of said counting members present in said part of said main storage channel; means for adjustably limiting the capacity of the parts of said auxiliary storage channels which are arranged to communicate with said main storage channel; and second scale means associated with said auxiliary storage channels for indicating the number of counting members present in each of said auxiliary storage channels.

5. An educational device comprising: a main storage channel, said channel having an origin at one end thereof; blocking means for adjustably limiting the capacity of part of said main storage channel at the end thereof at which said origin is located; shuttle means movable transversely of said main storage channel; a plurality of auxiliary storage channels on said shuttle means and arranged to be registered one at a time with said part of said main storage channel as said shuttle means is moved transversely thereof so that parts of said auxiliary storage channels may selectively communicate with said part of said main storage channel; a plurality of counting members adapted to roll from one registered channel to the other registered channel when one of said auxiliary storage channels is registered with said main storage channel; first scale means associated with said main storage channel and calibrated in relationship to said origin for indicating the number of said counting members present in said part of said main storage channel; means for adjustably limiting the capacity of the parts of said auxiliary storage channels which are arranged to communicate with said main storage channel; and fulcrum defining means for establishing a tilting axis normal to the axes of said storage channels whereby said counting members may be rolled from one of said registered channels to the other of said registered channels by gravity.

6. An educational device comprising: a body member; a main storage channel located on said body member, said channel having an origin at one end thereof; means for blocking said main storage channel at any desired point whereby a part of said main storage channel adjacent said origin may be isolated from the remainder thereof; a shuttle member disposed on said body member and adapted for transverse sliding movement thereon past said part of said main storage channel; a plurality of auxiliary storage channels on said shuttle member and arranged so that one end of each may be registered one at a time with said part of said main storage channel so that parts of said auxiliary storage channels at said one ends may selectively communicate with said part of said main storage channel; a plurality of spherical counting members rollable in said channels; first scale means associated with said main storage channel and calibrated in relationship to said origin for indicating the number of said counting members present in said part of said main storage channel; means for adjustably limiting the capacity of the parts of said auxiliary storage channels which enter into communication with said main storage channel; second scale means associated with said auxiliary storage channels for indicating the number of counting members present in each of said auxiliary storage channels; and fulcrum means on said body member for tilting said storage channels whereby said counting members may be rolled from one of said registered channels to the other of said registered channels by gravity.

7. An educational device comprising: a body member; an elongated main storage channel located on said body member, said channel having an origin at one end thereof; means for blocking said main storage channel at any desired point whereby a part of said main storage channel adjacent said origin may be isolated from the remainder thereof; a shuttle member disposed on said body member and adapted for transverse sliding movement thereon past said part of said main storage channel; a plurality of auxiliary storage channels on said shuttle member parallel to each other and to said main storage channel and arranged so that one end of each may be registered one at a time with said part of said main storage channel so that parts of said auxiliary storage channels at said one ends may selectively communicate with said part of said main storage channel; a plurality of spherical counting members rollable in said channels; first scale means associated with said main storage channel and calibrated in relationship to said origin for indicating the number of said counting members present in said part of said main storage channel; a cross bar mountable on said shuttle member along lines eaxtending across said auxiliary storage channels for adjustably limiting the capacity of the parts of said auxiliary storage channels which enter into communication with said main storage channel; second scale means associated with said auxiliary storage channels for indicating the number of counting members present in each of said parts of said auxiliary storage channels; and fulcrum defining means on said body member for establishing a tilting axis normal to the axes of said storage channels whereby said counting members may be rolled from one of said registered channels to the other of said registered channels by gravity.

8. An educational device comprising: a body member; an elongated main storage channel located on said body member, said channel having an origin at one end thereof; means for blocking said main storage channel at any desired point whereby a part of said main storage channel adjacent said origin may be isolated from the remainder thereof; a shuttle member disposed on said body member and adapted for transverse sliding movement thereon past said part of said main storage channel; a plurality of auxiliary storage channels on said shuttle member parallel to each other and to said main storage channel and arranged so that one end of each may be registered one at a time with said part of said main storage channel so that parts of said auxiliary storage channels at said one ends may selectively communicate with said part of said main storage channel; a plurality of spherical counting members rollable in said channels; first scale means associated with said main storage channel and calibrated in relationship to said origin for indicating the number of said counting members present in said part of said main storage channel; means for limiting the range of movement of said shuttle member on said body member; means for adjustably limiting the capacity of the parts of said auxiliary storage channels which enter into communication with said main storage channel; second scale means associated with said auxiliary storage channels for indicating the number of counting members present in each of said auxiliary storage channels; and fulcrum means on said body member for tilting said storage channels whereby said counting members may be rolled from one of said registered channels to the other of said registered channels by gravity.

References Cited in the file of this patent

UNITED STATES PATENTS

| | | |
|---|---|---|
| 502,184 | Gallegos | July 25, 1893 |
| 1,386,170 | Fierlein | Aug. 2, 1921 |
| 2,463,763 | Graff | Mar. 8, 1949 |
| 2,789,371 | Shanhouse | Apr. 23, 1957 |

FOREIGN PATENTS

| | | |
|---|---|---|
| 45,683 | Germany | Dec. 19, 1888 |
| 7,067 | Great Britain | Mar. 23, 1906 |